UNITED STATES PATENT OFFICE.

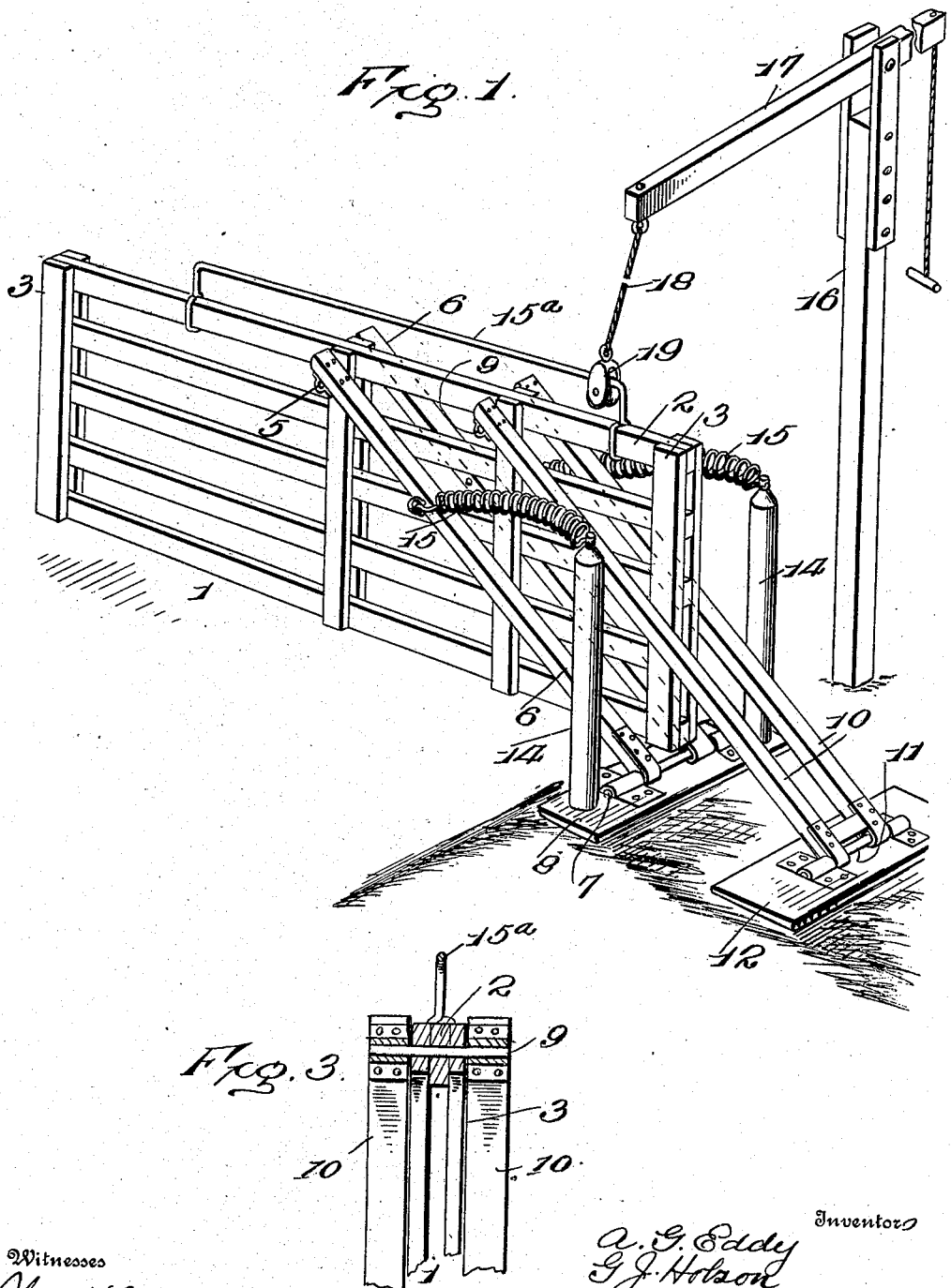

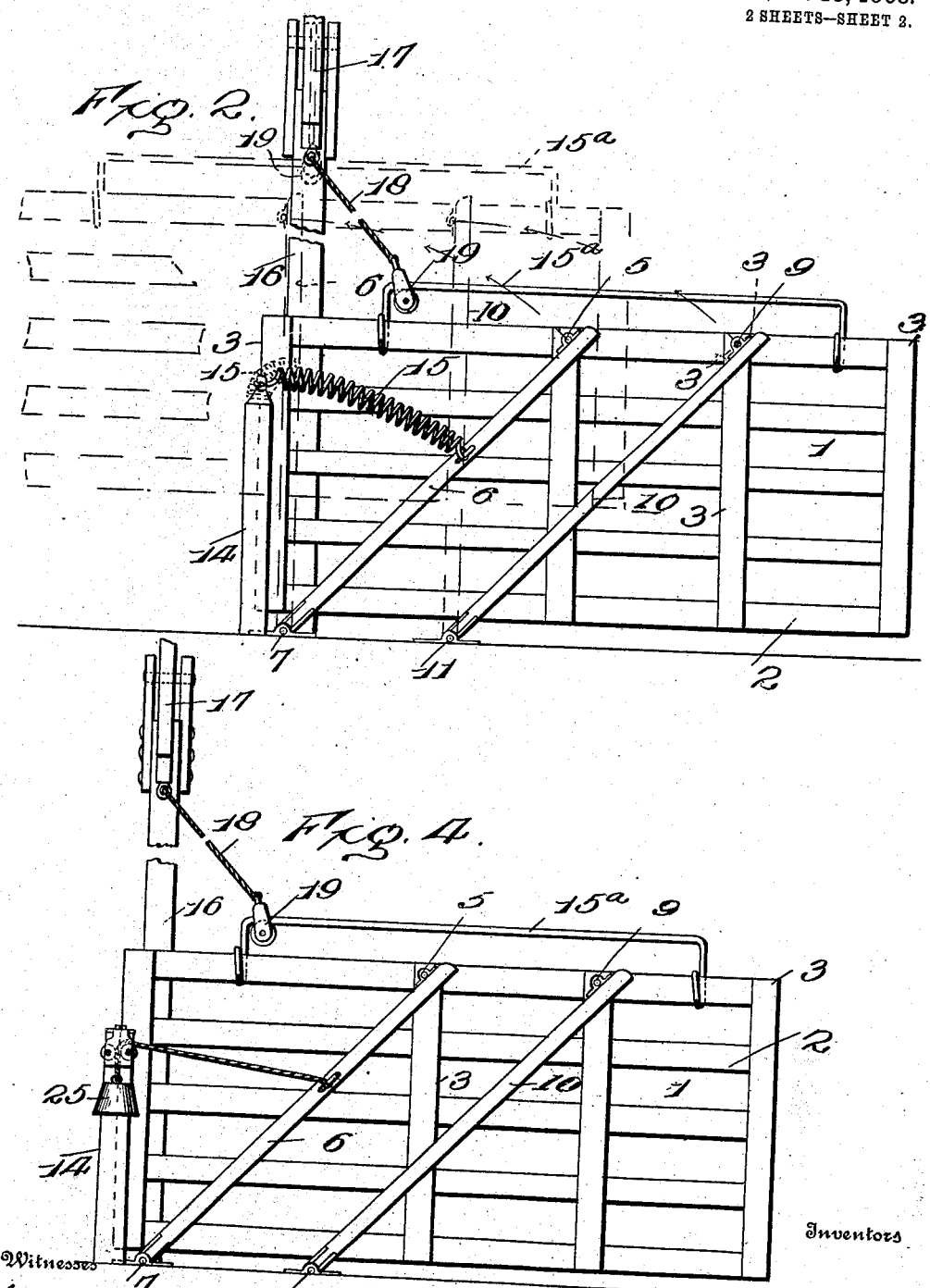

ALBERT G. EDDY AND GEORGE J. HOBSON, OF MOUNT VERNON, WASHINGTON.

FARM-GATE.

No. 901,161.　　　　Specification of Letters Patent.　　　Patented Oct. 13, 1908.

Application filed April 20, 1908.　Serial No. 428,211.

*To all whom it may concern:*

Be it known that we, ALBERT G. EDDY and GEORGE J. HOBSON, citizens of the United States, residing at Mount Vernon, in the county of Skagit and State of Washington, have invented certain new and useful Improvements in Farm-Gates, of which the following is a specification.

This invention relates to improvements in gates, and the primary object is to provide efficient and durable operating means.

The invention also relates to improvements in the details of construction and arrangement of parts, which will be hereinafter described and particularly pointed out in the claims.

In the drawings: Figure 1 is a perspective view of the improved gate, showing the same in closed position. Fig. 2 is a view in elevation of the gate in open position. Fig. 3 is a detail section on the line 3—3, Fig. 2. Fig. 4 is a view similar to Fig. 2, but showing a slight modification.

The numeral 1, indicates a gate of approved construction, including longitudinal panels 2, connected by transverse connecting bars 3. Pivotally connected to the gate at a point near the center and top, as indicated at 5, are two normally inclined rocking levers 6—6, pivoted at their lower ends at 7—7, to a mud-sill 8. Between the pivotal points 5—5, and the inner end bar 3, are pivoted at 9, two additional similarly inclined levers 10—10, pivoted at their lower ends 11, to a mud-sill 12. The levers 6 and 10, are disposed parallel to each other, to uniformly raise the gate during the opening and closing operation.

Adjacent the inner end bars 3, are two posts 14, to the upper ends of which are secured under tension coiled springs 15, connected at their opposite ends to the levers 6—6, at suitable points between the pivotal connections 5 and 7.

Secured near the ends of the uppermost panel 2, and spaced slightly therefrom is a track 15ª. Adjacent the gate is a post 16, at the upper end of which is pivotally mounted an operating lever 17, having at one end a rope or other convenient means for operating lever 17, and directly over the gate is a rope or other connection 18, having secured at its lower end a sheave 19, the roller of which engages the under side of the track 15ª.

Assuming the gate to be in closed position across the roadway, as shown in Fig. 1, when the operating lever 17, is pulled, the gate is elevated on the pivotal points 7 and 11, and by reason of its traveling in the arc of a circle, the track slides freely through the sheave. During the time the gate is being raised from its lowermost position until the levers 6 and 10, are vertical, the tension on the springs is being decreased. The springs are so arranged that they are under tension when the gate is in either open or closed position, therefore, when the operating lever 17, is pulled the springs serve to assist in lifting the gate. When the gate reaches the position shown in dotted lines in Fig. 2, the momentum is quite sufficient to move it past the dead center, when its own weight will cause it to fall into open position as shown in full lines on said figure.

As previously stated, as soon as the gate commences to fall from its elevated position tension on the springs is increased, which tends to remove the shock on the gate when it strikes the ground. In the meantime the track slides freely through the sheave, and assumes position for the next opening or closing operation, as the case may be.

Obviously weights 25, and cables may be substituted for the springs, as shown in Fig. 4, the operation being substantially the same as previously described.

What I claim is:

1. In combination, a gate, bearings independent of the gate, normally inclined levers pivoted at their upper ends to the gate, and their lower ends in the bearings, posts adjacent the gate, coiled springs connecting the posts and the normally inclined levers, said springs being under tension when the gate is in its open or closed position, a track carried by the gate, said track being parallel with the gate, a pivoted operating lever mounted above the plane of the top of the gate, a connection suspended from the operating gate, and a sheave carried by the connection and engaging under the track, said track moving freely over the sheave when the operating lever is tilted.

2. In combination, a gate, tilting levers supporting the gate, a track secured to the top of the gate, said track being almost the length of the gate, a pulley engaging the underside of the track, and operating means connected to the pulley to elevate the gate on the tilting levers to open and close said gate, the latter always remaining in a horizontal position during the opening and closing operation, the track passing freely over the pulley during operation of the gate.

In testimony whereof we have affixed our signatures in presence of two witnesses.

ALBERT G. EDDY.
GEORGE J. HOBSON.

Witnesses:
N. G. MILLER,
E. C. YOUNG.